L. H. RICHARDS.
Hand Corn-Planters.
No. 135,489.
Patented Feb. 4, 1873.
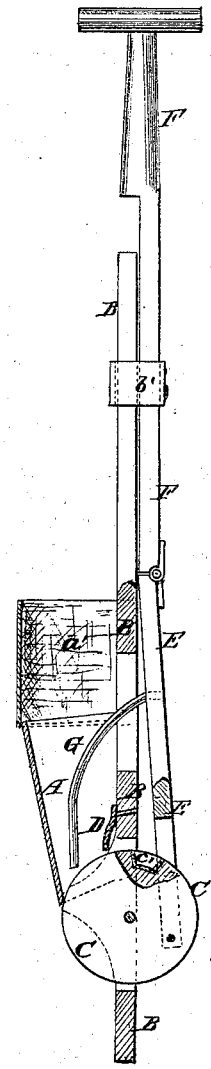
Witnesses:
P. C. Dieterich
S. Edgaick
Inventor:
L. H. Richards
per
Attorneys.

UNITED STATES PATENT OFFICE.

LOUIS H. RICHARDS, OF RISING SUN, MARYLAND.

IMPROVEMENT IN HAND CORN-PLANTERS.

Specification forming part of Letters Patent No. 135,489, dated February 4, 1873.

*To all whom it may concern:*

Be it known that I, LOUIS H. RICHARDS, of Rising Sun, in the county of Cecil and State of Maryland, have invented a new and useful Improvement in Corn-Dropper, of which the following is a specification:

The figure is a side view of my improved machine, parts being broken away to show the construction.

My invention has for its object to furnish an improved machine for dropping corn which shall be simple in construction, convenient in use, and reliable in operation, enabling the seed to be dropped uniformly, and any desired number of kernels at a time. The invention consists in the combination of the hopper, the bar to which it is attached, the dropping-wheel, the hinged bar, and the sliding bar with each other, and in the combination of the curved arm with the hinged bar, slotted bar, and hopper, as hereinafter more fully described.

A represents the seed-hopper, which is attached to a bar, B, and which may be enlarged to any desired extent without materially increasing its weight by cloth $a'$, attached to its upper edge and to the bar B. In a slot in the lower part of the bar B is pivoted a wheel, C, in such a position that its upper side or part may enter and fill a recess in the bottom of the hopper A. $c'$ is a cup secured in a recess in the face of a wheel, C, to receive seed from the hopper A, and discharge it upon the ground. The wheel C is kept from carrying out any more seed than enough to fill its cup by the rubber plate D, or other suitable cut-off attached to the bar B. E is a bar, the lower end of which is slotted to receive the wheel C, and is pivoted to said wheel near its circumference, and in such a position that the downward movement of the bar E will revolve the wheel C in such a direction that the cup D will discharge its contents upon the ground. The upper end of the bar E is hinged to the lower end of a bar, F, which has a keeper, $b'$, attached to it, through which the upper part of the bar B passes. To the upper end of the bar F is attached a handle, for convenience in carrying and operating the dropper. To the bar E is attached an arm, G, which passes into the hopper A through a narrow slot in the bar B, and is curved downward, so that as the dropper is operated the said arm G may work up and down through said hopper to prevent the seed from becoming clogged, and to keep it stirred up, so that it will pass freely to the dropping-wheel C.

In using the machine the lower end of the bar B is placed upon the ground, and the bar F is pressed downward, which turns the wheel C and deposits the contents of the cup $c'$ upon the ground. As the dropper is raised from the ground, the hopper A and bar B slide downward upon the bar F, which, together with the bar E, turns the wheel so that the cup $c'$ may again receive seed from the hopper A. The seed is thus dropped by using the machine in the same way as a cane is used.

Having thus described my invention, I claim as new and desire to secure by Letters Patent—

The slide E F combined with bar B, wheel C, hopper A, and stirrer G, as and for the purpose described.

LOUIS H. RICHARDS.

Witnesses:
   J. A. KIRK,
   E. HAINES, Jr.